(12) United States Patent
Kim et al.

(10) Patent No.: US 10,637,113 B2
(45) Date of Patent: Apr. 28, 2020

(54) HEAT SINK WITH TWO OR MORE SEPARATED CHANNELS

(71) Applicant: LG CHEM, LTD., Seoul (KR)

(72) Inventors: Min-Jung Kim, Daejeon (KR); Seung-Hun Jung, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 504 days.

(21) Appl. No.: 14/650,031

(22) PCT Filed: Oct. 7, 2014

(86) PCT No.: PCT/KR2014/009441
§ 371 (c)(1),
(2) Date: Jun. 5, 2015

(87) PCT Pub. No.: WO2015/056921
PCT Pub. Date: Apr. 23, 2015

(65) Prior Publication Data
US 2015/0318587 A1 Nov. 5, 2015

(30) Foreign Application Priority Data
Oct. 17, 2013 (KR) .................. 10-2013-0123912

(51) Int. Cl.
*H01M 10/00* (2006.01)
*H01M 10/6556* (2014.01)
(Continued)

(52) U.S. Cl.
CPC ......... *H01M 10/6556* (2015.04); *B60L 53/00* (2019.02); *B60L 58/21* (2019.02);
(Continued)

(58) Field of Classification Search
CPC ... H01L 27/2418; H01L 45/00; H01L 21/324; H01L 28/60; H01L 27/2463;
(Continued)

(56) References Cited

U.S. PATENT DOCUMENTS

| | | | |
|---|---|---|---|
| 2009/0142628 A1* | 6/2009 | Okada ................ | H01M 2/0237 429/8 |
| 2011/0132580 A1* | 6/2011 | Herrmann ................ | F28F 3/12 165/104.33 |

(Continued)

FOREIGN PATENT DOCUMENTS

| DE | 102008034885 | * | 1/2010 | ............ H01M 10/50 |
|---|---|---|---|---|
| DE | 102008034885 A1 | | 1/2010 | |

(Continued)

OTHER PUBLICATIONS

English Translation of DE102008034885.*
(Continued)

*Primary Examiner* — Nicholas P D'Aniello
(74) *Attorney, Agent, or Firm* — Birch, Stewart, Kolasch & Birch, LLP

(57) ABSTRACT

The present disclosure discloses a heat sink with two or more separated channels. The heat sink according to the present disclosure includes a cooling channel through which a refrigerant passes to cool a secondary battery by an indirect cooling method, the secondary battery including a cell assembly in which at least two unit cells are stacked, each unit cell including a positive electrode plate, a separator, and a negative electrode plate, and a plurality of positive and negative electrode tabs protruding from the positive and negative electrode plates of each unit cell is electrically connected to positive and negative leads, respectively, wherein the cooling channel has two or more separated (Continued)

channels. According to the present disclosure, provision of a cooling fin having a uniform cooling effect is enabled.

5 Claims, 5 Drawing Sheets

(51) Int. Cl.
| | |
|---|---|
| *H01M 10/613* | (2014.01) |
| *H01M 10/6551* | (2014.01) |
| *H01M 10/42* | (2006.01) |
| *H02J 7/00* | (2006.01) |
| *H01M 10/44* | (2006.01) |
| *B60L 58/21* | (2019.01) |
| *B60L 53/00* | (2019.01) |

(52) U.S. Cl.
CPC ....... *H01M 10/425* (2013.01); *H01M 10/441* (2013.01); *H01M 10/613* (2015.04); *H01M 10/6551* (2015.04); *H02J 7/0024* (2013.01); *H01M 2010/4271* (2013.01)

(58) Field of Classification Search
CPC .......... H01L 2924/0002; G11C 13/003; G11C 13/0002; G11C 13/0007; G11C 13/0069; G11C 2213/76; G11C 2013/0083; G11C 2213/15; G11C 2213/71; G11C 2213/77; H01M 10/6556; H01M 10/441; H01M 10/613; H01M 10/6551; H01M 10/425; H01M 2010/4271; H01M 10/60; H01M 10/6555; H02J 7/0024; B60L 11/1809; B60L 11/1864; B60L 58/21; B60L 53/00
See application file for complete search history.

(56) References Cited

U.S. PATENT DOCUMENTS

| | | | | |
|---|---|---|---|---|
| 2011/0212355 | A1* | 9/2011 | Essinger | H01M 2/1016 429/120 |
| 2011/0244297 | A1* | 10/2011 | Kruger | H01M 10/625 429/120 |
| 2013/0040175 | A1 | 2/2013 | Yang et al. | |
| 2013/0189557 | A1 | 7/2013 | Haussmann | |
| 2013/0280575 | A1 | 10/2013 | Obrist et al. | |
| 2014/0295228 | A1* | 10/2014 | Yan | H01M 2/1077 429/83 |
| 2014/0335390 | A1 | 11/2014 | Hwang et al. | |

FOREIGN PATENT DOCUMENTS

| | | | | |
|---|---|---|---|---|
| DE | 102010056204 | * | 9/2011 | ............ H01M 10/50 |
| DE | 102010056204 A1 | | 9/2011 | |
| JP | 2012-164456 A | | 8/2012 | |
| KR | 10-2011-0090491 A | | 8/2011 | |
| KR | 10-2012-0054770 A | | 5/2012 | |
| KR | 10-1205181 B1 | | 11/2012 | |
| KR | 10-2013-0062056 A | | 6/2013 | |
| KR | 10-1293971 B1 | | 8/2013 | |
| KR | 10-2013-0104660 A | | 9/2013 | |
| WO | WO 2012/056276 A1 | | 5/2012 | |
| WO | WO 2013/072093 | * | 10/2014 | ........ H01M 10/5075 |
| WO | WO2013/072093 | * | 10/2014 | ........ H01M 10/5075 |

OTHER PUBLICATIONS

English Translation of DE102010056204.*
International Search Report, issued in PCT/KR2014/009441, dated Jan. 27, 2015.

* cited by examiner

HEAT SINK WITH TWO OR MORE SEPARATED CHANNELS

TECHNICAL FIELD

The present disclosure relates to a heat sink, and more particularly, to a heat sink with two or more separated channels.

The present application claims priority to Korean Patent Application No. 10-2013-0123912 filed in the Republic of Korea on Oct. 17, 2013, the disclosures of which are incorporated herein by reference.

BACKGROUND ART

Due to its characteristics of being easily applicable to various products and electrical properties such as a high energy density, a secondary battery is not only commonly applied to a portable device, but universally applied to an electric vehicle (EV) or a hybrid electric vehicle (HEV) and an energy storage system that is propelled by an electric motor. This secondary battery is gaining attention for its primary advantage of remarkably reducing the use of fossil fuels and not generating by-products from the use of energy, making it a new eco-friendly and energy efficient source of energy.

A battery pack for use in electric vehicles has a structure consisting of a plurality of cell assemblies connected in series, each cell assembly including a plurality of unit cells, to obtain high power. Also, the unit cell includes a positive electrode current collector and a negative electrode current collector, a separator, an active material, and an electrolyte solution, and allows repeated charging and discharging by electrochemical reactions between the constituent elements.

Recently, with the growing need for a high-capacity structure as well as utilization as an energy storage source, there is an increase in demand for a battery pack of a multi-module structure in which a plurality of battery modules including a plurality of secondary batteries connected in series and/or in parallel are assembled.

Because a battery pack of a multi-module structure is designed to have a plurality of secondary batteries arranged with a high density in a narrow space, it is important to easily discharge heat generated from the respective secondary batteries. One of the various methods of discharging heat generated from a secondary battery, a cooling method using a coolant is disclosed in Korean Patent Application Publication No. 10-2013-0062056.

FIG. 1 is a diagram illustrating the design of a cooling channel 10 according to a related art.

Referring to FIG. 1, the cooling channel 10 for cooling a secondary battery is illustrated. A refrigerant flowing in the cooling channel 10 enters an inlet 11 and exits an outlet 12. In the cooling channel 10 of the above structure, the secondary battery is more cooled at the inlet 11 side and is less cooled at the outlet 12 side. That is, the farther from the inlet 11 and closer to the outlet 12 the location is, the higher the temperature of the coolant is, so the cooling efficiency reduces.

The above problem of the related art causes a temperature gradient of the secondary battery, and the temperature gradient of the secondary battery leads to a performance gradient of the secondary battery. Finally, it connects with performance deterioration of a system such as a battery pack including the secondary battery. Therefore, there is a need for the design of a cooling channel to provide a uniform cooling effect.

DISCLOSURE

Technical Problem

The present disclosure is designed to address the above issue of the related art, and therefore, the present disclosure is directed to providing a heat sink with two or more separated channels.

Technical Solution

To achieve the above object, a heat sink according to the present disclosure includes a cooling channel through which a refrigerant passes to cool a secondary battery by an indirect cooling method, the secondary battery including a cell assembly in which at least two unit cells are stacked, each unit cell including a positive electrode plate, a separator, and a negative electrode plate, and a plurality of positive and negative electrode tabs protruding from the positive and negative electrode plates of each unit cell is electrically connected to positive and negative leads, respectively, wherein the cooling channel has two or more separated channels.

According to one embodiment of the present disclosure, each cooling channel inlet of the separated channels may be formed at opposing locations with respect to a center of the heat sink.

According to another embodiment of the present disclosure, each cooling channel inlet of the separated channels may be formed at diagonal locations with respect to a center of the heat sink.

According to still another embodiment of the present disclosure, each cooling channel inlet of the separated channels may be formed near other cooling channel inlet on a same side of the heat sink.

According to still another embodiment of the present disclosure, each cooling channel inlet of the separated channels may be formed near other cooling channel outlet on a same side of the heat sink.

The heat sink according to the present disclosure may be an element of an indirect secondary battery cooling apparatus including the heat sink and a cooling fin which comes into contact with one surface of the secondary battery.

The indirect secondary battery cooling apparatus according to the present disclosure may be an element of a battery module including the indirect secondary battery cooling apparatus and at least two secondary batteries.

The battery module according to the present disclosure may be an element of a battery pack including a plurality of battery modules and a battery management system which controls the charge and discharge of the battery modules.

The battery pack according to the present disclosure may be an element of a battery operating system including the battery pack and a load which is supplied with power from the battery pack. In this instance, the load may be an electrical drive means or a portable device.

Advantageous Effects

Two or more separated cooling channels according to the present disclosure have a shorter movement distance than a related art. Thus, as compared to the related art, a rate at which the temperature rises with the increasing distance from an inlet of the cooling channel is relatively low. That is, the problem of the related art, i.e., the cooling efficiency reduces with the increasing distance from the inlet of the cooling channel, may be solved.

Therefore, provision of a heat sink having a uniform cooling effect is enabled.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawings.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIGS. 2 through 5 are cross-sectional views illustrating heat sinks 100, 200, 300, and 400 with cooling channels according to the present disclosure.

The heat sink according to the present disclosure uses an indirect cooling method to cool a secondary battery. According to the indirect cooling method, heat generated from the secondary battery is transferred to a cooling fin by a contact between the surface of the secondary battery and the cooling fin. To dissipate the heat, the cooling fin is connected to a heat sink having a large surface area, and the heat is transferred from the cooling fin to the heat sink. Also, the heat sink is cooled by a coolant again. Thus, the indirect cooling method is a method which cools the secondary battery through the cooling fin and the heat sink, without requiring the coolant to directly pass through the secondary battery. In FIGS. 2 through 5, the cooling channel formed inside the heat sink should be understood from a cross sectional area of the heat sink.

Contrary to a related art, the present disclosure features two or more separated cooling channels. The two or more separated cooling channels have a shorter movement distance than the related art. Thus, as compared to the related art, a rate at which the temperature rises with the increasing distance from an inlet of the cooling channel is relatively low. That is, the problem of the related art, i.e., the cooling efficiency reduces with the increasing distance from the inlet of the cooling channel, may be solved.

Figure 1:
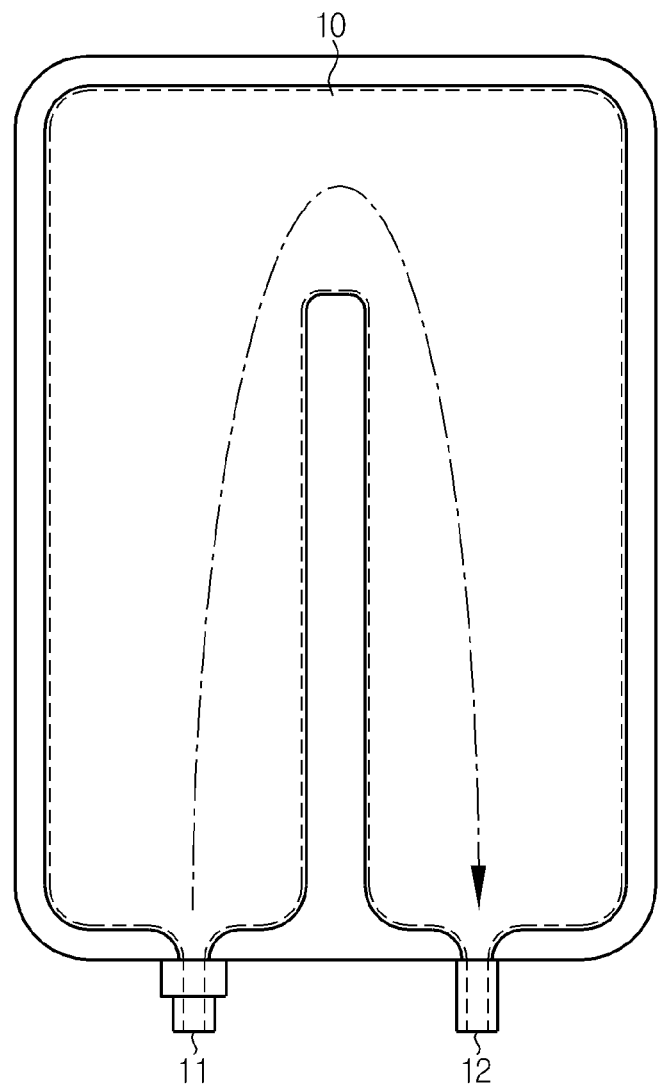
FIG. 1 is a diagram illustrating the design of a cooling channel according to a related art.
Figure 2:
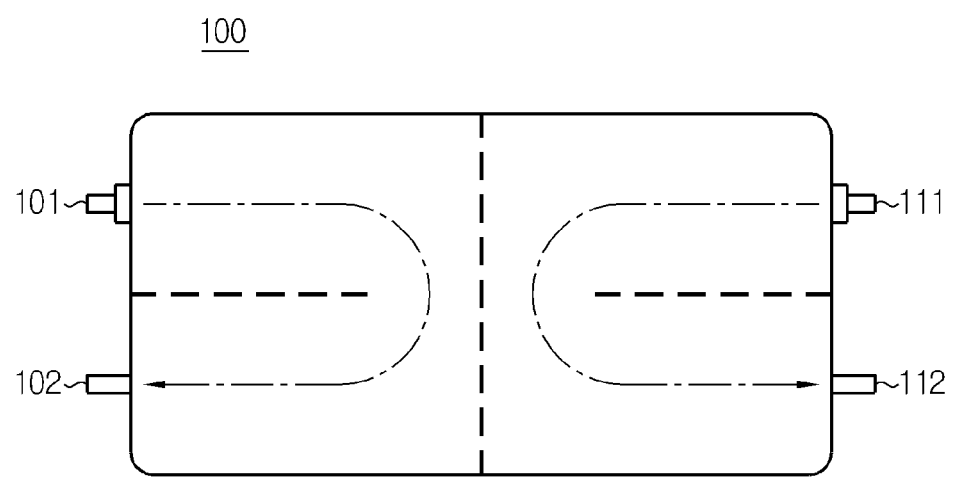
FIGS. 2 through 5 are cross-sectional views illustrating a heat sink with a cooling channel according to the present disclosure.

According to one embodiment of the present disclosure, as shown in FIG. 2, inlets 101 and 111 of the two or more cooling channels are formed at opposing locations with respect to the center of the heat sink 100. In this instance, outlets 102 and 112 of the cooling channels may be also formed at opposing locations with respect to the center of the heat sink 100.

Figure 3:
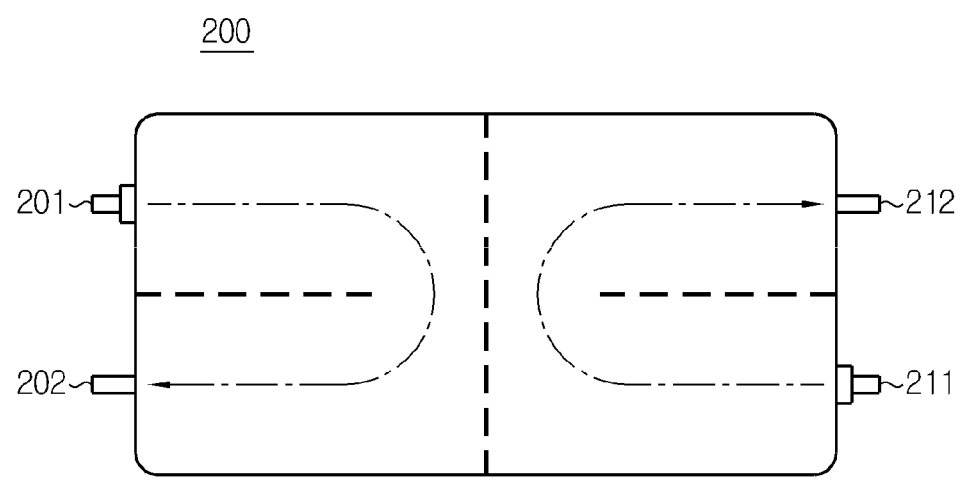

According to another embodiment of the present disclosure, as shown in FIG. 3, inlets 201 and 211 of the two or more cooling channels are formed at diagonal locations with respect to the center of the heat sink 200. In this instance, outlets 202 and 212 of the cooling channels may be also formed at diagonal locations with respect to the center of the heat sink heat sink 200.

Although FIGS. 2 and 3 show that a refrigerant flows in the cooling channel only one time for simplification of the drawings, it should be understood that the internal cooling channel may be variously formed.

The heat sinks 100 and 200 described with reference to FIGS. 2 and 3 are designed such that a heat sink area is divided into halves, a cooling channel is split into halves, and each channel covers half the cooling. As a channel length is half the channel length of a traditional heat sink, a maximum distance from the inlets 101 and 111 and 201 and 211 of the cooling channels to a point where heat is generated may be reduced by half. Furthermore, as an inflow of coolant flows in two halves, there is an advantage of reducing a loss of pressure in the same system.

Figure 4:
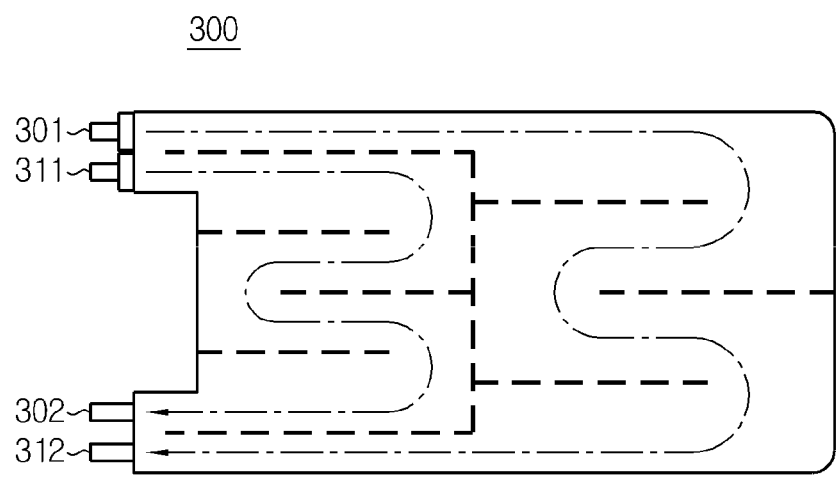

According to still another embodiment of the present disclosure, as shown in FIG. 4, each cooling channel inlet 301 or 311 of the separated channels is formed near the other cooling channel inlet 311 or 301 on the same side of the heat sink 300.

Figure 5:
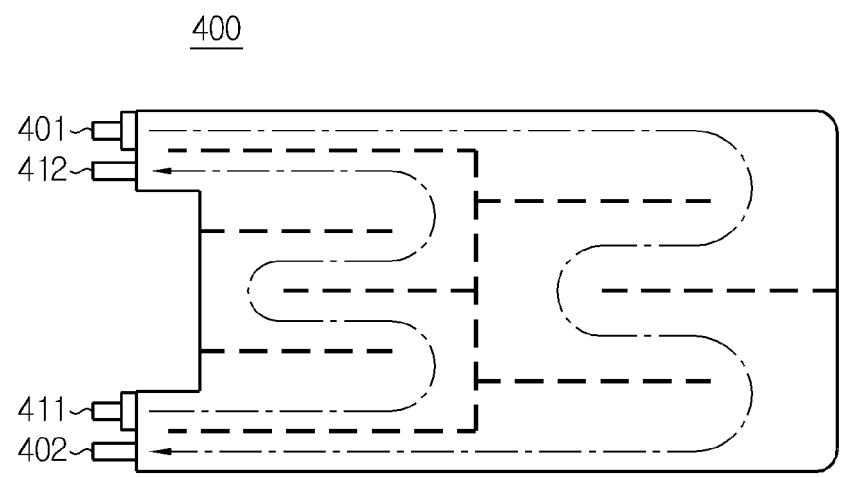

According to still another embodiment of the present disclosure, as shown in FIG. 5, each cooling channel inlet 401 or 411 of the separated channels is formed near the other cooling channel outlet 412 or 402 on the same side of the heat sink 400.

Although FIGS. 2 through 5 present a heat sink with two separated channels as an example, the heat sink according to the present disclosure may have two or more separated cooling channels as described above. Thus, with the increasing number of separated cooling channels, the number of inlets and outlets of each cooling channel may increase.

The heat sink according to the present disclosure may be an element of an indirect secondary battery cooling apparatus including the heat sink and a cooling fin in contact with one surface of a secondary battery.

The indirect secondary battery cooling apparatus according to the present disclosure may be an element of a battery module including the indirect secondary battery cooling apparatus and at least two secondary batteries.

The battery module according to the present disclosure may be an element of a battery pack including a plurality of battery modules and a battery management system which controls the charge and discharge of the battery modules.

The battery pack according to the present disclosure may be an element of a battery operating system including the battery pack and a load which is supplied with power from the battery pack.

The battery operating system may be, for example, an electric vehicle (EV), a hybrid electric vehicle (HEV), an electric bike, a power tool, an energy storage system, an uninterruptible power supply (UPS), a portable computer, a mobile phone, a portable audio player, or a portable video player, and the load may be a motor that generates a rotational force by power supplied from a battery pack, or a power inverter circuit that inverts power supplied from a battery pack to power required for various circuit components.

The heat sink according to the present disclosure does not limit the scope of the invention by the secondary battery being cooled. The secondary battery includes a cell assembly in which at least two unit cells are stacked, each unit cell including a positive electrode plate, a separator, and a negative electrode plate, and a plurality of positive and negative electrode tabs protruding from the positive and negative electrode plates of each unit cell is electrically connected to positive and negative leads, respectively.

The positive electrode plate is primarily made from aluminum. Alternatively, the positive electrode plate may be made from stainless steel, nickel, titanium, baked carbon, or aluminum or stainless steel treated with carbon, nickel, titanium, or silver on the surface. Further, the positive electrode plate is not limited to a particular material if it has a high conductivity while not causing a chemical change in the secondary battery.

The positive electrode tab is provided at a certain area of the positive electrode plate, and may extend from the positive electrode plate. Alternatively, the positive electrode tab may be formed by joining a member of a conductive material to a predetermined portion of the positive electrode plate, for example, through welding. Also, the positive electrode tab may be formed by coating and drying a positive electrode material on a certain area of a peripheral surface of the positive electrode plate.

The negative electrode plate corresponding to the positive electrode plate is primarily made from copper. Alternatively, the negative electrode plate may be made from stainless steel, aluminum, nickel, titanium, baked carbon, or copper or stainless steel treated with carbon, nickel, titanium, or silver on the surface, and aluminum-cadmium alloys may be also used.

The negative electrode tab is also provided at a certain area of the negative electrode plate, and similar to the positive electrode tab described above, may extend from the negative electrode plate, and the negative electrode tab may be formed by joining a member of a conductive material to a predetermined portion of the negative electrode plate, for example, through welding, and may be formed by coating and drying a negative electrode material on a certain area of a peripheral surface of the negative electrode plate.

The positive electrode lead is electrically connected to the positive electrode tab of the positive electrode plate, and the negative electrode lead is electrically connected to the negative electrode tab of the negative electrode plate. Preferably, the positive electrode lead and the negative electrode lead are joined with a plurality of positive electrode tabs and a plurality of negative electrode tabs, respectively.

The positive electrode plate and the negative electrode plate are coated with a positive electrode active material and a negative electrode active material, respectively. As an example, the positive electrode active material is a lithium-based active material, and as a typical example, may include metal oxide such as $LiCoO_2$, $LiNiO_2$, $LiMnO_2$, $LiMn_2O_4$, $LiFePO_4$, or $Li_{1+z}Ni_{1-x-y}Co_xM_yO_2$ ($0 \leq x \leq 1$, $0 \leq y \leq 1$, $0 \leq x+y \leq 1$, $0 \leq z \leq 1$, M denotes a metal such as Al, Sr, Mg, La, and Mn). The negative electrode active material is a carbon-based active material, and may include a carbon material such as crystalline carbon, amorphous carbon, carbon complex, and carbon fibers, lithium metals, and lithium alloys. The type and chemical composition of the positive electrode active material and the negative electrode active material may change based on the type of the secondary battery, and it should be understood that the above particular example is just one example.

The separator is not limited to a particular type, provided it is made from a porous material. The separator may be formed of a porous polymer membrane, for example, a porous polyolefin membrane, polyvinylidene fluoride-co-hexafluoropropylene, polyvinylidene fluoride-trichloroethylene, polymethylmetacrylate, polyacrylonitrile, polyvinylpyrrolidone, polyvinylacetate, ethylene vinyl acetate copolymer, polyethyleneoxide, cellulose acetate, cellulose acetate butylate, cellulose acetate propionate, cyanoethylpullulan, cyanoethylpolyvinylalcohol, cyanoethylcellulose, cyanoethylsucrose, pullulan, carboxyl methyl cellulose, acrylonitrile butadiene styrene copolymer, polyimide, polyethylene terephthalate, polybutylene terephthalate, polyester, polyacetal, polyamide, polyetheretherketone, polyethersulfone, polyphenylene oxide, polyphenylene sulfidro, polyethylene naphthalene, a non-woven membrane, a membrane having a porous web structure, or combinations thereof. Inorganic particles may be bound to one surface or both surfaces of the separator.

The inorganic particles are preferably inorganic particles having a high dielectric constant greater than or equal to 5, and more preferably, inorganic particles having a high dielectric constant greater than or equal to 10 and a low density. This facilitates the transfer of lithium ions moving in the battery. Non-limiting examples of inorganic particles having a high dielectric constant greater than or equal to 5 include $Pb(Zr,Ti)O_3$ (PZT), $Pb_{1-x}La_xZr_{1-y}Ti_yO_3$ (PLZT), $Pb(Mg_3Nb_{2/3})O_3$-$PbTiO_3$(PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO, $Y_2O_3$, or mixtures thereof.

The cell assembly may have a simple stack structure of a plurality of unit cells with an insulating membrane interposed between the unit cells. As another example, the cell assembly may have a stack folding structure in which unit cells are arranged at an optimum interval on an upper surface and/or a lower surface of an insulating membrane and the insulating membrane is folded in one direction together with the unit cells, so the unit cells are inserted between the folded insulating membrane. As another example, the cell assembly may have a jelly roll structure formed by mounting, on an insulating membrane, a unit cell extending in the shape of a strand and continuously rolling up the unit cell and the insulating membrane together in one direction. The insulating membrane may be made from a material that may be employed as the separator. According to circumstances, the insulating membrane may be made from the same material membrane and/or with the same structure as the separator.

Hereinabove, the present disclosure has been described by limited embodiments and drawings, but the present disclosure is not limited thereto and it should be understood that various changes and modifications may be made by an ordinary person skilled in the art within the spirit and scope of the disclosure and the appended claims and their equivalents.

What is claimed is:
1. A battery module comprising:
   at least two secondary batteries, each secondary battery including a cell assembly in which at least two unit cells are stacked, each unit cell comprising a positive electrode plate, a separator, and a negative electrode plate, and a plurality of positive and negative electrode tabs protruding from the positive and negative elec- trode plates of each unit cell electrically connected to positive and negative leads, respectively; and a planar heat sink having a length and a height, the heat sink comprising a cooling channel through which a refrigerant passes to cool the at least two secondary batteries, wherein the cooling channel has only two separated channels including a first channel and a second channel, wherein the first channel is separated from the second channel and has different inlets and outlets from the second channel, wherein each of the first and second channels has only a single bend that is symmetric about a center of the height of the heat sink, wherein the heat sink comprises two separate sides separated by a center of the length of the heat sink including a first side and a second side, wherein the entirety of the first channel, including the inlet and outlet of the first channel, is located within the first side and the entirety of the second channel, including the inlet and outlet of the second channel, is located within the second side, and wherein each cooling channel inlet of the separated channels is formed at diagonal locations with respect to a center of the heat sink.

2. The battery module of claim 1, further comprising:
a cooling fin in contact with one surface of at least one of the secondary batteries.

3. A battery pack comprising:
a plurality of battery modules according to claim 1; and
a battery management system which controls the charge and discharge of the battery modules.

4. A battery operating system comprising:
a battery pack according to claim 3; and
a load which is supplied with power from the battery pack.

5. The battery operating system according to claim 4, wherein the load is an electrical drive means or a portable device.

* * * * *